United States Patent Office 3,600,357
Patented Aug. 17, 1971

3,600,357
OPTICALLY BRIGHTENED POLYESTERS CONTAINING SEGMENTS DERIVED FROM 2,5-DIMETHOXYCINNAMIC ACID
Mary J. Stewart, Riddlewood, Media, and John A. Price, Swarthmore, Pa., assignors to FMC Corporation, Philadelphia, Pa.
No Drawing. Filed Apr. 18, 1969, Ser. No. 817,552
Int. Cl. C08g 17/08, 17/14
U.S. Cl. 260—47                    3 Claims

ABSTRACT OF THE DISCLOSURE

A copolyester resin comprising the condensation product of (a) a saturated dicarboxylic acid or its lower alkyl diester, (b) a lower aliphatic glycol, and (c) a minor proportion of 2,5-dimethoxycinnamic acid or its lower alkyl ester.

This invention relates to highly polymeric linear copolyester resins that possess improved optical brightness and to a method of preparing same.

The highly polymeric linear copolyester resins of the present invention are known as saturated linear copolyesters and can be used for fiber- and film-forming purposes. Saturated linear copolyester resins can be prepared by first carrying out a condensation reaction between aromatic dicarboxylic acid components or esters thereof, which do not contain any ethylenic unsaturation, and one or more suitable lower aliphatic glycols to form a prepolymer. The resulting prepolymer is then polycondensed to form the desired copolyester resin. When esters of dicarboxylic acids are used as the starting material, they are first reacted with a glycol component in the presence of a transesterification or ester-interchange catalyst by means of an ester-interchange reaction; whereas when dicarboxylic acids are used as the starting material, they are first subjected to a direct esterification reaction with one or more glycols in the presence of what is generally called a first stage additive or ether inhibitor. In either instance, the resulting product which may be generally described as a copolyester prepolymer is then polycondensed in the presence of a polycondensation catalyst to form the desired copolyester resin.

From a commercial standpoint, it is essential that copolyester resins suitable for melt spinning into shaped articles such as filaments should have a carboxyl content value of about or below 50 equivalents per million grams (eq./$10^{-6}$ gr. or meq./kg.), an intrinsic viscosity preferably not less than about 0.60 (determined in a 60% phenol–40% tetrachloroethane solution, wt./wt., at 30° C.), a diethylene glycol content preferably less than about 1 percent by weight and a suitably high melting point in order for the shaped articles formed therefrom to possess a relatively high level of hydrolytic stability, thermal stability and a high degree of tenacity. It is also essential for most uses that such polyester copolymers should exhibit substantially no off-color.

Generally, when polyester and copolyester resins are to be used for filament-forming purposes it is necessary that such resins exhibit what is considered good color. For instance, quite often polyester and copolyester resins produced by the above denoted procedures will exhibit a yellow tinge or off-white color which will make the resins unsatisfactory for use in the manufacture of filaments for utilization in the manufacture of fabrics.

It is known that it is often desirable to optically brighten polyester resin products by means of a brightening or whitening agent which will impart a generally blue fluorescence to the resin product under the ultraviolet light components of daylight. This optical brightening action is the result of an ability of the brightener to convert the ultraviolet light components of daylight to visible blue components which complement the undesired yellow tinge or off-white color of the resin products.

Therefore, it is an object of the present invention to prepare highly polymeric linear copolyester resins which exhibit improved optical brightness.

This and other objects are accomplished in accordance with the present invention with copolyester resins comprising the condensation product of (a) a saturated dicarboxylic acid or its lower alkyl diester, which does not contain any ethylenic unsaturation, (b) an aliphatic glycol containing from 2 to 10 carbon atoms, and (c) a minor proportion of 2,5-dimethoxycinnamic acid or its lower alkyl ester.

It will be obvious to those skilled in the present art that when preparing the subject copolyesters by the direct esterification method that 2,5-dimethoxycinnamic acid is used, whereas when the subject copolyesters are prepared by the ester-interchange reaction a corresponding lower alkyl ester of said acid is used.

The 2,5-dimethoxycinnamic acid or its lower alkyl esters used as a monomer in the present invention can be represented by the following general formula:

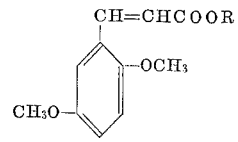

wherein R is selected from the group consisting of hydrogen and a lower alkyl radical containing from 1 to 6 carbon atoms. Any of the compounds coming within the above general formula can be used as a comonomer reactant to incorporate optical brightness into polyester resins.

The above described optical brightener monomer when copolymerized with other suitable polyester or copolyester monomeric reactants to form new and improved thermoplastic copolyesters is chemically bonded to the ends of the polymer chains.

Specifically, any saturated linear polyester or copolyester resin can be enhanced with regard to optical brightness by incorporating on the ends of the polymer chains a minor amount of the subject monomeric unit derived from 2,5-dimethoxycinnamic acid or its lower alkyl esters.

The present optical brightening component designated under (c) above may be incorporated into the polymer chain of any linear polyester and copolyester compositions by merely copolymerizing same with the initial polyester reactants or prepolymer. In general, in accordance with the present invention, 2,5-dimethoxycinnamic acid or its alkyl esters can be copolymerized with any dicarboxylic acid or corresponding esters, which does not contain any ethylenic unsaturation, that are commonly used to prepare polyester and copolyester resins. For example, among those which can be used in combination with the present optical brightener monomer are terephthalic acid, isophthalic acid, p,p'-sulfonyldibenzoic acid, 1,4-naphthalene dicarboxylic acid, 1,6-naphthalene dicarboxylic acid, and 4,4'-diphenyl dicarboxylic acid or any combination thereof.

Among the glycols which can be used in the preparation of the subject copolyester resins any of those represented by the general formula $HO(CH_2)_nOH$ wherein $n$ is from 2 to 10. For example, among the diols that can be used are ethylene glycol, butylene glycol, hexamethylene glycol, and decamethylene glycol.

The 2,5-dimethoxycinnamic acid or ester monomeric reactant can be incorporated into the polyester chain at any time during its preparation. For instance, the 2,5-dimethoxy cinnamic acid or alkyl ester thereof can be incorporated in the reaction mixture before the esterification or transesterification reaction is begun or at any point thereafter, such as at the beginning of the polycondensation stage. Specifically, it has been found that 2,5-dimethoxycinnamic acid or its alkyl ester will bring about the desired brightening effect when used in amounts ranging from about 0.01 mole percent to about 3.0 mole percent based on the moles of dicarboxylic acid or corresponding diester reactant used in the reaction mixture. In most instances, it has been found that it is preferred to use amounts ranging from about 0.04 mole percent to about 1.0 mole percent. Obviously, larger or smaller amounts can also be used. However, it has been determined that when concentrations greater than about 3.0 mole percent are used, based on the moles of the dicarboxylic acid or diester reactant used in the original reaction mixture, no additional advantage is achieved; whereas when concentrations less than about 0.01 mole percent are used, its effectiveness is somewhat diminished.

The preparation of polyesters and copolyesters via the ester-interchange is generally carried out with a molar ratio of diol to dicarboxylic acid diester of from about 1:1 to about 15:1 respectively, but preferably from about 1.2:1 to about 2.6:1. The transesterification reaction is generally carried out at atmospheric pressure in an inert atmosphere such as nitrogen at a temperature range of 124° C. to about 250° C. but preferably from about 150° C. to 250° C. in the presence of a transesterification catalyst. During the first stage of this reaction, the respective alkanol is evolved and continuously removed by distillation. After a reaction period of from about 1 to 2 hours, the temperature of the reaction mixture is raised from 200° C. to 300° C. for approximately 1 to 3 hours in order to complete the transesterification reaction to form the desired polyester prepolymer and distill off any excess diol which may be present.

Any suitable transesterification or ester-interchange catalyst, for example, lithium hydride, lithium amide, or zinc acetate can be used to catalyze the present transesterification reaction. Generally, the transesterifiaction catalysts are used at a concentration ranging from about 0.01% to about 0.20% based on the weight of the dicarboxylic acid diester used in the initial reaction mixture.

Similarly, the preparation of polyesters and copolyesters via the direct esterification method is generally carried out with a molar ratio of diol to dicarboxylic acid ranging from 1:1 to about 15:1 but preferably 1.5:1 to about 2.6:1. The direct esterification step is carried out at a temperature ranging from about 180° C. to about 280° C. in the absence of an oxygen containing atmosphere at atmospheric or elevated pressure from about 2 to 4 hours in order to form the desired polyester prepolymer and distill off any excess diol. For example, the reaction may be carried out in an atmosphere of nitrogen.

Any known first stage additive or ether inhibitor may be used in the direct esterification step of the present method. For example, calcium acetate or triethylamine can be used. The first stage additives are generally used in concentrations ranging from $5 \times 10^{-5}$ mole to about $5 \times 10^{-2}$ mole of catalytic additive per mole of dicarboxylic acid present in the initial dicarboxylic acid-diol mixture.

The polycondensation step used in the preparation of the present copolyester resins is accomplished by adding a polycondensation catalyst, such as antimony trioxide, lead acetate, or antimony oxalate, to a copolyester prepolymer and heating the blend thereof under reduced pressure within the range of about 0.05 mm. to 20 mm. of mercury while being agitated under a temperature of 260° C. to about 325° C. for from 2 to 4 hours. The polycondensation catalysts are generally employed in amounts ranging from about 0.01% to about 0.2% based on the weight of the prepolymer to be polycondensed. Usually, it has been found that from 0.02% to 0.1% of the polycondensation catalysts are preferred in most instances.

The following examples of several preferred embodiments of the subject invention will further serve to illustrate the present invention.

EXAMPLE I

A mixture comprising 600 grams of dimethyl terephthalate, 396 mls. of ethylene glycol, 0.70 grams of methyl-2,5-dimethoxycinnamate [0.1 mole percent based on moles of dimethyl terephthalate (DMT)] and 0.24 gram of lithium hydride was charged into a reaction vessel equipped with a nitrogen inlet, heating means and stirring means. The reaction mixture was agitated and heated at atmospheric pressure to about 197° C. in a nitrogen atmosphere. The reaction mixture was held at about 197° C. for about 2 hours during which time by-product methyl alcohol was distilled off. Then, the temperature was allowed to rise to about 230° C. over a period for about 1 hour to distill off any remaining by-product methyl alcohol and any excess glycol and form a polyester prepolymer. The prepolymer product was allowed to cool under an atmosphere of hydrogen.

50 grams of the prepolymer product made above in this example was mixed with 0.02 gram of antimony trioxide and placed in a reaction vessel. The reaction mixture was heated to about 280° C. at about 0.1 mm. of mercury pressure while under agitation for about 2 hours to bring about the polycondensation of the prepolymer and formation of a copolyester resin. The copolyester resin formed had an intrinsic viscosity of 0.64, a carboxyl content value of 12 meq./kg., a diethylene glycol content of 0.49%, a color of 70.2, and a melting point of 251° C. (DTA).

EXAMPLE II

A mixture comprising 599.4 grams of dimethyl terephthalate, 396 mls. of ethylene glycol, 1.37 grams of methyl-2,5-dimethoxycinnamate (0.2 mole percent based on moles of DMT), and 0.24 gram of lithium hydride was charged into a reaction vessel equipped with a nitrogen inlet, heating means and stirring means. The reaction mixture was agitated and heated at atmospheric pressure to about 197° C. in a nitrogen atmosphere. The reaction mixture was held at about 197° C. for about 2 hours during which time by-product methyl alcohol was distilled off. Then, the temperature was allowed to rise to about 230° C. over a period for about 1 hour to distill off any remaining by-product methyl alcohol and any excess glycol and form a polyester prepolymer. The prepolymer product was allowed to cool under an atmosphere of hydrogen.

50 grams of the prepolymer product made above in this example was mixed with 0.02 gram of antimony trioxide and placed in a reaction vessel. The reaction mixture was heated to about 280° C. at about 0.1 mm. of mercury pressure while under agitation for about 2 hours to bring about the polycondensation of the prepolymer and formation of a copolyester resin. The copolyester resin formed had an intrinsic viscosity of 0.63, a carboxyl content value of 11 meq./kg., a diethylene glycol content of 0.73%, a color of 64.6, and a melting point of 250° C. (DTA).

EXAMPLE III

A mixture comprising 24.9 grams of dimethyl terephthalate, 16.5 grams of ethylene glycol, 0.14 gram of methyl-2,5-dimethoxycinnamate (0.5 mole percent based on mole of DMT), and 0.01 gram of lithium hydride were charged into a reaction vessel equipped with a nitrogen inlet, bubbling means and heating means. The reaction mixture was heated at atmosphereic pressure to about 197° C. while nitrogen was bubbled through the reaction mixture. The reaction mixture was held at about 197° C. for about 2 hours during which time methyl alcohol was distilled off. Then, the temperature was allowed to rise to about 230° C. over a period of about 30 minutes to distill off any remaining by-product methyl alcohol and excess glycol and form a polyester prepolymer. The prepolymer product was allowed to cool under an atmosphere of nitrogen.

0.01 gram of antimony trioxide was added to 25 grams of the above prepolymer and this reaction mixture was heated to about 280° C. at a pressure of about 0.1 mm. of mercury for about 4 hours to bring about the polycondensation of the prepolymer and formation of a copolyester resin. The copolyester resin product had an intrinsic viscosity of 0.63, a carboxyl content value of 22 meq./kg., diethylene glycol content of 0.49%, a color of 54.2, and a melting point of 255° C. (DTA).

EXAMPLE IV 600 grams of dimethyl terephthalate, 396 mls. of ethylene glycol, and 0.24 gram of lithium amide was charged into a reaction vessel equipped with a nitrogen inlet, heating means and stirring means. The reaction mixture was agitated and heated at atmospheric pressure to about 197° C. in a nitrogen atmosphere. The reaction mixture was held at about 197° C. for about 2 hours during which time by-product methyl alcohol was distilled off. Then the temperature was allowed to rise to about 230° C. over a period of about 1 hour to distill off any remaining by-product methyl alcohol and any excess glycol and form the polyester prepolymer. The resulting prepolymer was allowed to cool under an atmosphere of nitrogen.

25 grams of the above prepared prepolymer in this example, 0.01 gram of antimony oxalate, and 0.2117 gram of 2,5-dimethoxycinnamic acid (1.0 mole percent based on moles of DMT) was placed in a reaction vessel. This reaction mixture was heated at about 280° C. at about 0.1 mm. of mercury pressure for about 4 hours to bring about the polycondensation of the prepolymer and formation of the copolyester resin. The copolyester resin formed had an intrinsic viscosity of 0.62, a carboxyl content value of 24 meq./kg., diethylene glycol content of 0.42%, a color of 57.6, and a DTA melting point of 258° C.

EXAMPLE V 600 grams of dimethyl terephthalate, 396 mls. of ethylene glycol, and 0.24 gram of lithium hydride was charged into a reaction vessel equipped with a nitrogen inlet, heating means and stirring means. The reaction mixture was agitated and heated at atmospheric pressure to about 197° C. in a nitrogen atmosphere. The reaction mixture was held at about 197° C. for about 2 hours during which time by-product methyl alcohol was distilled off. Then the temperature was allowed to rise to about 230° C. over a period of about 1 hour to distill off any remaining by-product methyl alcohol and any excess glycol and form the polyester prepolymer. The resulting prepolymer was allowed to cool under an atmosphere of nitrogen.

25 grams of the above prepared prepolymer, 0.01 gram of antimony trioxide, and 0.0106 gram of 2,5-dimethoxycinnamic acid (0.05 mole percent based on moles of DMT) was placed in a reaction vessel. This reaction mixture was heated at about 280° C. at about 0.1 mm. of mercury pressure for about 4 hours to bring about the polycondensation of the prepolymer and formation of a copolyester resin. The copolyester resin formed had an intrinsic viscosity of 0.58, a carboxyl content value of 27 meq./kg., diethylene glycol content of 0.95%, and a melting point of 254° C. (DTA).

EXAMPLE VI 25 grams of the prepolymer prepared above in Example V, 0.01 gram of antimony trioxide, and 0.0042 gram of 2,5-dimethoxycinnamic acid (0.02 mole percent based on moles of DMT) was placed in a reaction vessel. This reaction mixture was heated at about 280° C. at about 0.1 mm. of mercury pressure for about 4 hours to bring about the polycondensation of the prepolymer and formation of the copolyester resin. The copolyester resin formed had an intrinsic viscosity of 0.79, a carboxyl content value of 18 meq./kg., diethylene glycol content of 0.96%, and a melting point of 255° C. (DTA).

EXAMPLE VII 25 grams of the prepolymer prepared above in Example V, 0.01 gram of antimony trioxide, and 0.0021 gram of 2,5-dimethoxycinnamic acid (0.01 mole percent based on moles of DMT) was placed in a reaction vessel. This reaction mixture was heated at about 280° C. at about 0.1 mm. of mercury pressure for about 4 hours to bring about the polycondensation of the prepolymer and formation of the copolyester resin. The copolyester resin formed had an intrinsic viscosity of 0.51, a carboxyl content value of 23 meq./kg., a diethylene glycol content of 0.48%, and a melting point of 257° C. (DTA).

The copolyester resins prepared above in Examples I to VII were evaluated visually for fluorescence under ultraviolet light. The results of this evaluation are given in the table below. The letter A was awarded to the copolyester resin exhibiting the brightest fluorescence and a polyethylene terephthalate resin control containing no optical brightener was given the rating of F. The letters B to D were likewise awarded in the descending order depending on the brightness of the copolyester resin under ultraviolet light.

TABLE

| Resin sample: | U.V. rating [2] |
|---|---|
| PET control [1] | F |
| Example I | A |
| Example II | A |
| Example III | B |
| Example IV | A |
| Example V | B |
| Example VI | C |
| Example VII | C |

[1] Polyethylene terephthalate.
[2] Ultraviolet light rating.

The numerical color values given in the above examples for copolyester resin products are based on luminance (Y in the C.I.E. System) which is a measure of the proportion of the incidence light reflected by a sample relative to a white vitrolite standard and, therefore, a measure of the whiteness of the copolyester resin product being evaluated. The subject numerical color values were obtained by measuring the reflectance of the resin with the "Color Eye" (Model D 1) which is the trade name for the differential colorimeter manufactured by the Intrument Development Laboratories, Attleboro, Mass. Based on a theoretical possible Y value of 100, the higher the Y value, the whiter the resin product.

The optically brightened copolyester resin products of the present invention are considered to be particularly desirable due to the fact that the primary ester units of the basic polyester need only be modified to a slight degree with the subject optical brightener monomer in order to achieve the desired result. Further, the optical brighteners of the present invention form an integral part of the polymer backbone; and hence, the resulting improved copolyester resin will be extremely resistant to washing and other handling to which fabrics made from such copolyesters may be subjected.

The intrinsic viscosity of the copolyester resin products of the above examples were measured in a 60% phenol-40% tetrachloroethane solution (wt./wt.) at 30° C. The melting points of the resin products of the above examples were determined by a standard differential thermal analysis (DTA) procedure. The other analytical values were obtained by conventional laboratory procedures.

We claim:

1. The resinous linear copolyesters of (a) a saturated dicarboxylic acid, (b) an aliphatic glycol and (c) from about 0.01 mole percent to about 3.0 mole percent of 2,5-dimethoxycinnamic acid based on the moles of (a) present.

2. The composition of claim 1 wherein (a) is terephthalic acid and (b) is ethylene glycol.

3. The composition of claim 1 wherein the aliphatic glycol contains from 2 to 10 carbon atoms.

References Cited

UNITED STATES PATENTS 3,030,208  4/1962  Schellenberg et al. _____ 260—47(UP)X
3,344,115  9/1967  Rein _____ 260—47C

OTHER REFERENCES

Journal American Chemical Society, vol. 79, pp. 220 and 225, Jan. 5, 1957, article by Anliker et al.

WILLIAM H. SHORT, Primary Examiner

L. P. QUAST, Assistant Examiner